（12）United States Patent
Benzinger

(10) Patent No.: US 11,679,464 B2
(45) Date of Patent: Jun. 20, 2023

(54) METHOD FOR AUTOMATED POSITIONING OF A BLANK IN A PROCESSING MACHINE

(71) Applicant: vhf camfacture Aktiengesellschaft, Ammerbuch (DE)

(72) Inventor: Frank Benzinger, Ammerbuch (DE)

(73) Assignee: vhf camfacture Aktiengesellschaft, Ammerbuch (DE)

( * ) Notice: Subject to any disclaimer, the term of this patent is extended or adjusted under 35 U.S.C. 154(b) by 265 days.

(21) Appl. No.: 16/994,712

(22) Filed: Aug. 17, 2020

(65) Prior Publication Data

US 2021/0053169 A1  Feb. 25, 2021

(30) Foreign Application Priority Data

Aug. 20, 2019  (DE) ............... 10 2019 005 849.6

(51) Int. Cl.
| | |
|---|---|
| *B23Q 17/24* | (2006.01) |
| *B23Q 17/20* | (2006.01) |
| *B23Q 15/22* | (2006.01) |
| *G05B 19/4097* | (2006.01) |
| *A61C 13/00* | (2006.01) |
| *B23Q 5/10* | (2006.01) |
| *B23Q 17/22* | (2006.01) |

(52) U.S. Cl.
CPC ............. *B23Q 15/22* (2013.01); *B23Q 5/10* (2013.01); *B23Q 17/2291* (2013.01); *B23Q 17/2409* (2013.01); *B23Q 17/249* (2013.01); *B23Q 17/2471* (2013.01); *B23Q 2705/145* (2013.01); *B23Q 2717/006* (2013.01)

(58) Field of Classification Search
CPC ... B23Q 17/249; B23Q 17/24–17/2495; B23Q 17/2476; B23Q 17/2409; G05B 2219/35162; A61C 13/0004
USPC .......................................................... 700/171
See application file for complete search history.

(56) References Cited

U.S. PATENT DOCUMENTS

| | | | | |
|---|---|---|---|---|
| 5,757,950 A | * | 5/1998 | Bruder ................... | B26D 5/007 700/171 |
| 2006/0032348 A1 | | 2/2006 | Veikkolainen et al. | |
| 2007/0048689 A1 | | 3/2007 | Holzner et al. | |

FOREIGN PATENT DOCUMENTS

| | | | |
|---|---|---|---|
| AT | 514068 B1 | * | 10/2014 |
| DE | 203 16 004 | | 4/2004 |
| EP | 2679339 A2 | * | 1/2014 |

(Continued)

*Primary Examiner* — Erica E Cadugan
(74) *Attorney, Agent, or Firm* — Gudrun E. Huckett

(57) ABSTRACT

In a method for automated positioning of a blank in a processing machine provided with a housing and a spindle unit with an electric motor, a control unit for control and electrical supply of the processing machine, a computer producing processing programs for manufacturing workpieces, a workpiece holder, and an image recording unit that optically records image data of a blank received in the workpiece holder, a blank is fixed in the processing machine and the image recording unit produces an image of the blank. A division of the blank into an already processed region and into an unprocessed region based on the image data of the image is performed. A workpiece geometry to be produced is assigned to the unprocessed region of the blank, and a milling operation is performed on the unprocessed region. In a variant of the method, the image recording unit is separate from the processing unit.

12 Claims, 6 Drawing Sheets

(56) References Cited

FOREIGN PATENT DOCUMENTS

JP 62-181810 A * 8/1987

* cited by examiner

METHOD FOR AUTOMATED POSITIONING OF A BLANK IN A PROCESSING MACHINE

BACKGROUND OF THE INVENTION

The invention relates to a method for automated positioning of a blank in a processing machine.

For producing dental prostheses, e.g. dental crowns, dental bridges or the like, blanks of various materials are machined (cut) in processing machines, in particular dental milling machines. In this context, the manufacturing process is comprised of a plurality of processing operations, for example, milling, grinding, polishing. For processing a blank, the latter is placed into a workpiece holder and subsequently positioned. In the so-called positioning operation, the position and orientation of the blank in the processing machine must be determined. The virtual coordinates of the blank which are stored in the processing machine are adjusted to the real actual coordinates. Subsequently, manufacture of the workpiece can be carried out.

In case a blank still comprises a sufficient amount of material after processing, further workpieces can be manufactured from the only partially processed blank. For this purpose, in known dental milling machines, the milling processes that have been performed on the blanks are stored in the form of a data set, for example, by an NC (numerical control) program, whereby conclusions in regard to the geometry of the already processed blank can be drawn by means of a CAM (computer-aided manufacturing) software. Based on the stored data, the operator programs a new processing operation to be performed on a still unprocessed region of the blank. An exact positioning of the blank in the processing machine is required so that the processing operation is indeed realized in the region of the blank that has been selected by the operator.

The blanks which are used in the dental field are frequently designed as round blanks of rotational symmetry. Thus, in order to determine the absolute position of the blank, the blanks are provided with a special marking. Such markings can be, for example, an RFID (radio frequency identification) chip but also special geometric features such as a groove or a step at the blank. For detecting these markings, for example, scanners or optical sensors are used. Another possibility of determining the position of the blanks is milling a notch into the blank during the first processing operation performed on the blank. When using the blank again, the blank is to be aligned along its notch relative to the processing machine by the operator. A further possibility resides in clamping the blank in a so-called clamping frame which itself is aligned, in turn, upon clamping relative to the processing machine. However, the blank must then stay clamped within the clamping frame for its entire life because otherwise it would lose its orientation relative to the clamping frame and thus also relative to the processing machine. In both cases, however, the complete history of the CAM data sets is required because an unprocessed processing region at the blank must be fixed already during programming.

A disadvantage of such processing machines is that for a further processing operation to be performed on a blank a stored data set must always be relied upon and the real blank itself must have corresponding markings that enable a positioning of the blank. Therefore, for each only partially processed blank a data set must be stored which leads to an extremely complex management of the data sets. The current trend toward increased material diversity and color diversity for dental prostheses intensifies the problem of management expenditure for such blanks. When the blanks are clamped in corresponding clamping frames, this requires corresponding procurement costs for a plurality of such clamping frames. When different systems are employed, it is frequently not possible to transfer data sets from one CAM system to another CAM system. This can negatively impact the degree of utilization of the corresponding systems.

The invention has the object to provide a method for automated positioning of a blank in a processing machine which enables a production process with reduced administrative expenditure.

SUMMARY OF THE INVENTION

In accordance with the invention, this is achieved by a method for automated positioning of a blank in a processing machine, in particular in a dental milling machine, wherein the processing machine comprises a housing and a spindle unit with an electric motor, wherein the control and the electrical supply of the processing machine is realized via a control unit, further comprises a computer for generating processing programs for manufacturing workpieces, a workpiece holder, and an image recording unit for optical recording of image data of a blank received in the workpiece holder, wherein the method comprises the following steps:

fixing a blank in the processing machine, in particular in the workpiece holder, recording an image of the blank by means of the image recording unit, dividing the blank into an already processed region and into an unprocessed region based on the recorded image data, assigning a workpiece geometry to be produced to the unprocessed region of the blank, and performing the milling operation.

In accordance with the invention, this is further achieved by a method for processing a blank, wherein a processing machine for processing the blank, in particular a dental milling machine, comprises a housing and a spindle unit with an electric motor, wherein the control and the electrical supply of the processing machine is realized via a control unit, wherein the processing machine comprises a workpiece holder and a computer for generating processing programs for manufacturing workpieces, wherein the method comprises the following steps:

recording an image of the blank by means of an image recoding unit that is embodied separate from the processing machine, wherein the image recoding unit serves for optical recording of image data of a blank, dividing the blank into an already processed region and into an unprocessed region based on the recorded image data, assigning a workpiece geometry to be produced to the unprocessed region of the blank, inserting the blank into the processing machine, in particular the workpiece holder of the processing machine, and performing the milling operation in the unprocessed region of the blank.

The processing machine that is provided for the method for automated positioning of the blank comprises a computer for producing processing programs for manufacturing workpieces, a workpiece holder, and an image recording unit for optical recording of image data of a blank which is received in the workpiece holder. The method comprises the following steps in the indicated sequence:

A blank is fixed in the processing machine, in particular in the workpiece holder.

Subsequently, an image of the blank is produced by means of the image recording unit.

The blank is divided into an already processed region and into an unprocessed region based on the recorded image data by means of the computer.

A workpiece geometry to be produced is assigned to the unprocessed region of the blank.

Subsequently, the milling operation is performed.

In the automated optical positioning method, the blank is analyzed by means of the image recording unit in the workpiece receptacle. The processing machine detects the precise position and orientation of the blank. The still unprocessed region of the blank is detected and the workpiece to be manufactured is assigned to this region. Data in regard to the blank, in particular partially processed blank, for example, stored in the computer, are no longer required. Accordingly, the loss of the history of the CAM (computer-aided manufacturing) data sets or a conversion to a different CAM (computer-aided manufacturing) system can be compensated. It is even possible to completely dispense with the storage of data sets and reduce their complex management in this way. Moreover, the identification or labeling of the blanks by corresponding markings, such as notches, or clamping in clamping frames is no longer required for positioning the blank.

It is advantageously provided that the image recording unit is arranged in the housing of the processing machine. In this way, a compact construction of the processing machine is enabled. The image recording unit comprises preferably at least one camera. The camera is preferably arranged above the workpiece holder. In this context, the camera lens of the camera is oriented toward the workpiece holder. It is advantageously provided that the camera comprises a longitudinal axis and that the camera is oriented such that the longitudinal axis of the camera is oriented coaxially to the workpiece holder. In this way, a distortion-free image of the blank can be produced. Based on these image data, a two-dimensional contour of the blank in plan view, i.e., in the direction from the camera toward the blank, is produced.

It is advantageously provided that the division of the blank is calculated by means of a software algorithm on the basis of the contrast between the processed region and the unprocessed region. Below the workpiece holder, preferably a light source for increasing the contrast is provided. When producing a dental prosthesis, the material is removed from the blank across its entire height so that cutouts are produced at the blank. The light source shines through the cutouts of the blank so that the cutouts can be more precisely differentiated from the still present material of the blank. Due to the increase of the contrast, the software algorithm can compute in a reliable manner the contours between processed regions and unprocessed regions.

The assignment of the workpiece geometry to be produced to the unprocessed region of the blank is realized preferably in an automated fashion by the control unit. In an alternative embodiment according to the invention of the processing machine, the assignment of the workpiece geometry to be produced to the unprocessed region of the blank is carried out by the computer by means of a CAM system. In this context, the image data processed by the software algorithm are transmitted to the CAM system. Thus, the CAM system has available the contour of the blank which is clamped in the workpiece receptacle. On the basis of this contour, the workpiece geometry to be processed can be positioned in the unprocessed region of the blank. Subsequently, the CAM system issues an NC (numerical control) program that is transmitted to the control unit.

The processing machine comprises preferably a workpiece changer. It is advantageously provided that the processing machine, after an assignment of the workpiece geometry has failed, accesses a further blank, in particular of the same material, stored in the workpiece holder. Should the unprocessed region of the blank be too small to manufacture the workpiece from the residual blank, a new blank is selected from the workpiece changer. This process is repeated until the workpiece to be processed can be assigned successfully to a blank.

A method for processing a blank that is also in accordance with the invention comprises the following steps:

producing an image of the blank by means of an image recording unit which is embodied separate from the processing machine, wherein the image recording unit serves for optical recording of image data of a blank;

dividing the blank into an already processed region and into an unprocessed region based on the recorded image data;

assigning a workpiece geometry to be produced to the unprocessed region of the blank, inserting the blank into the processing machine, in particular into the workpiece holder of the processing machine, and performing the milling operation in the unprocessed region of the blank.

The processing machine for processing a blank, in particular a dental milling machine, that is provided for this method comprises a housing and a spindle unit with an electric motor. The control and the electrical supply of the processing machine is realized by means of a control unit. The processing machine comprises a workpiece holder and a computer for generating processing programs for manufacturing workpieces.

By means of an image recording unit which is embodied separate from the processing machine, i.e., an external image recording unit, an image of the blank is recorded. The produced image data are conveyed to the processing machine. When comparing the image data and the workpiece to be produced, it can be detected whether the unprocessed region of the blank is sufficiently large for manufacturing the workpiece from the blank. The workpiece is assigned to the unprocessed region of the blank. After the blank has been inserted into the processing machine, the milling operation can be started. Since the unprocessed regions are determined on the basis of the recorded image data, no manufacturing data such as CAM data sets must be stored. An assignment of unprocessed regions of the blank can therefore be realized without such CAM data sets by means of processing of the image data obtained by the image recording unit.

It can be advantageous to generate by means of the external image recording unit the image data of the blank when it is already held in the workpiece holder. For this purpose, an image can be recorded by the image recording unit external to the processing machine. Alternatively, the image recording unit comprises a sufficiently small size in order to enable recording of an image inside the processing machine, i.e., within the housing. In this case, the insertion of the blank into the processing machine is realized first and an image of the blank is recorded subsequently.

The image recording unit is preferably a portable computer with a camera. Such a computer can be a laptop, a tablet computer, or a mobile phone. Other devices, for example, optical 3D scanners or the like, can also be expedient as an image recording unit. Accordingly, in particular by means of the mobile phone, due to its compact size, images can be recorded within the processing machine, i.e., the blank can already be inserted in the processing machine at the time of recording the image.

Preferably, the blank is aligned by means of a marking provided at the blank when inserted into the workpiece holder. In this way, the blank is arranged in a predetermined position which leads to overlying of the coordinate system of the blank with that of the processing machine. Preferably, the workpiece holder also comprises a marking at which the blank can be aligned. The alignment of the markings of the blank and of the workpiece holder can be mechanically realized. This is in particular necessary when the image recording of the blank is done prior to insertion of the blank into the processing machine. In this way, a precise positioning of the workpiece in the workpiece holder can be realized. When image recording of the blank already inserted in the workpiece holder is carried out, the position of the blank in the workpiece holder can also be computed based on the image data. For this purpose, the relative position of the blank relative to the workpiece holder can be computed based on the respective marking. Alternatively, the position of blank and workpiece holder relative to each other can be determined based on distinctive geometric sections, for example, structures milled into the blank.

It is advantageously provided that the image data recorded by the image recording unit are transmitted by a data connection to the computer of the processing machine. The data connection can be realized in particular by a cable connection, preferably by a wireless connection such as Bluetooth or the like.

BRIEF DESCRIPTION OF THE DRAWING

Further features of the invention result from the further claims, the description, and the drawings in which an embodiment of the invention described in detail in the following is illustrated.

DESCRIPTION OF THE PREFERRED EMBODIMENTS

Figure 1:
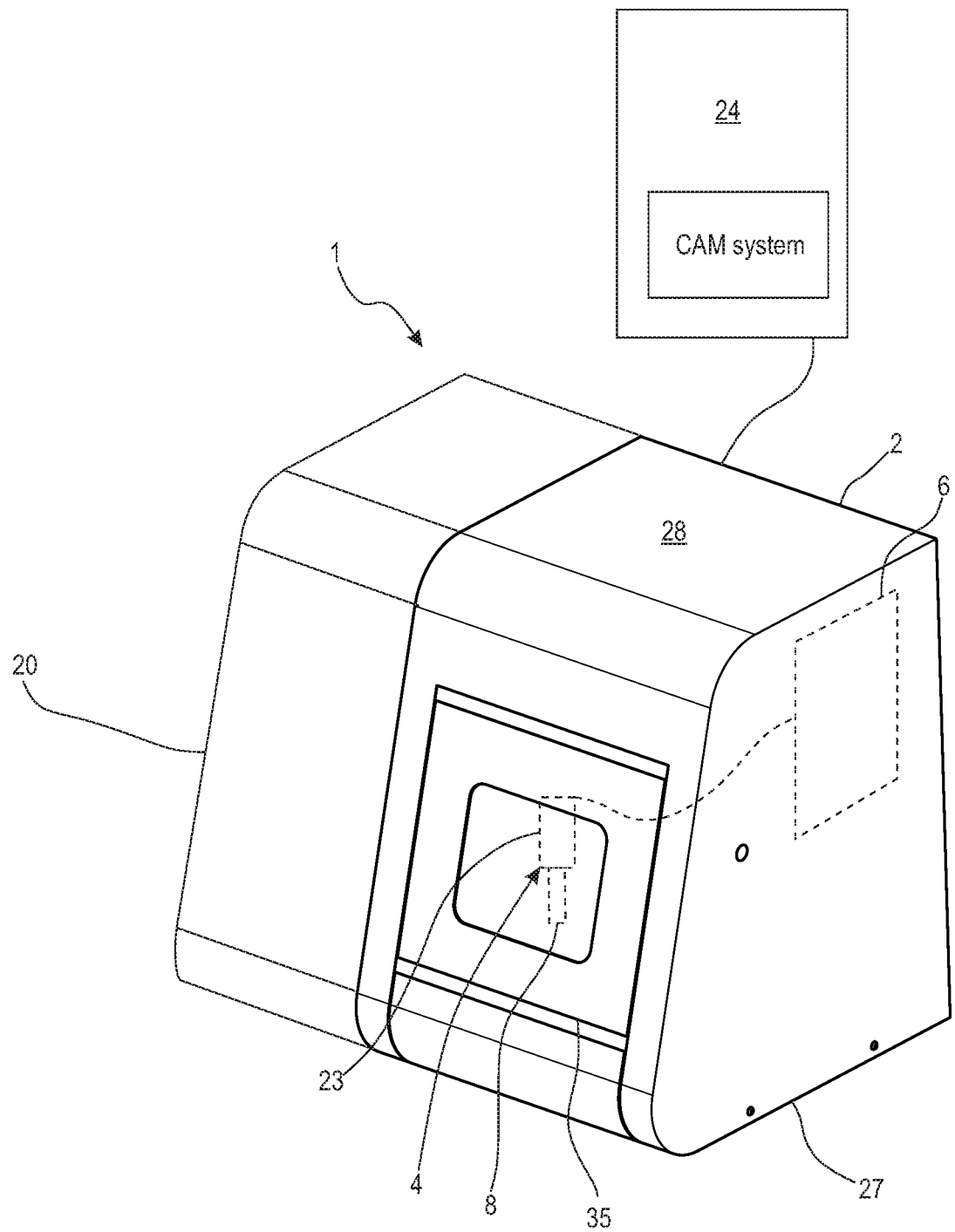
FIG. 1 is a schematic view of a dental milling machine.

FIG. 1 is a perspective illustration of a processing machine 1 which is a dental milling machine in the embodiment. The processing machine 1 is provided for producing a dental prosthesis, in particular for manufacturing dental crowns and dental bridges. The processing machine 1 comprises a housing 2 with a loading door 35. The housing 2 delimits an interior of the processing machine 1. When the loading door 35 is opened, access to the interior of the processing machine 1 is open in order to insert or remove a blank 11, for example. The housing 2 of the processing machine 1 comprises a top side 28 and a bottom side 27 on which the processing machine 1 is supported. Accordingly, the term "top" indicates a direction extending from the bottom side 27 to the top side 28 of the processing machine 1 and the term "bottom" indicates the opposite direction. In the processing machine 1, a spindle unit 4 is arranged wherein the spindle unit 4 in the preferred embodiment is adjustable in space by a translatory movement as well as rotational movement by means of a drive system that is not illustrated herein. In an alternative embodiment, the drive system can also be designed such that the spindle unit 4 is adjustable only by translatory movement or only by rotational movement.

The processing machine 1 comprises a control unit 6 schematically shown in FIG. 1. The spindle unit 4 shown in FIG. 1 comprises a spindle 8 and an electric motor 23. The electric motor 23 is connected by an electrical connector of the spindle unit 4 to the control unit 6. The control unit 6 serves for electrical supply and control of the spindle unit 4 as well as of the drive system.

Figure 2:
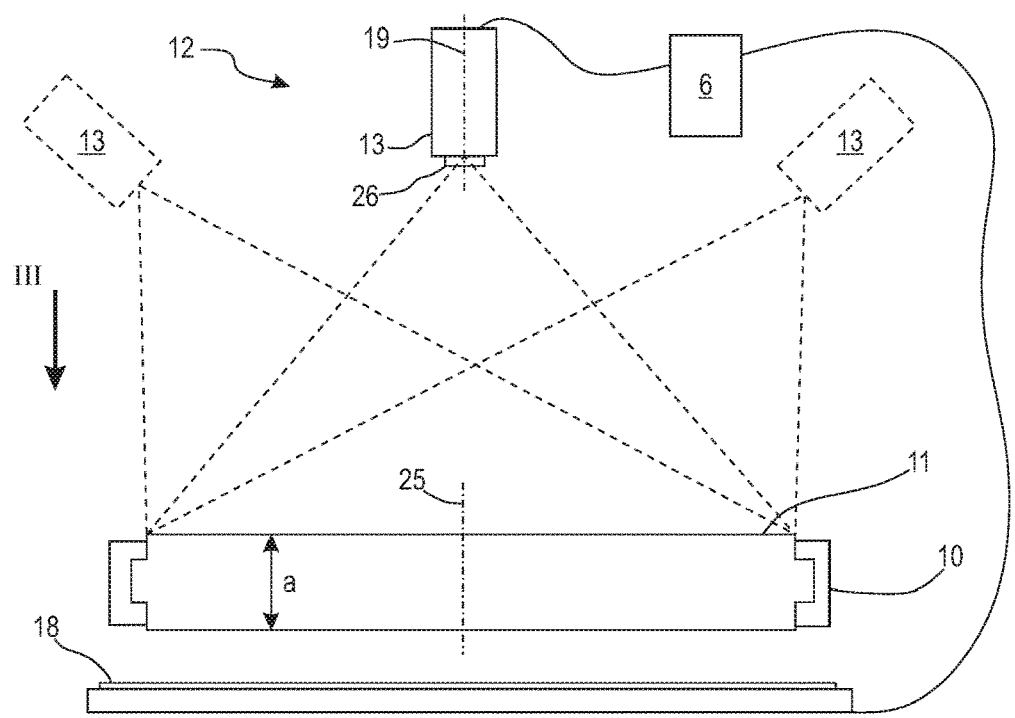
FIG. 2 is a schematic side view of a blank between an image recording unit and a light source.
Figure 3:
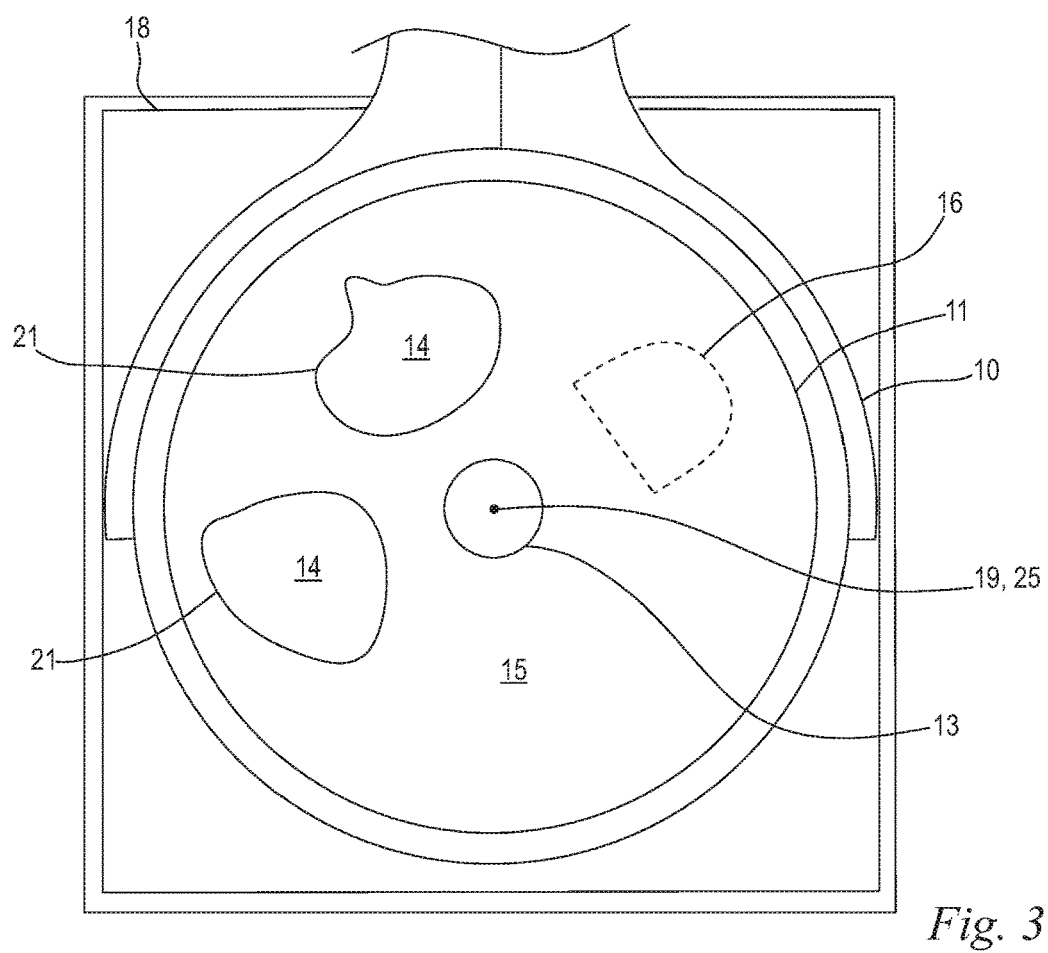
FIG. 3 is a plan view of the blank according to FIG. 2 in the direction of arrow III.

The processing machine 1 comprises a workpiece holder 10 which is shown in FIG. 2 in a schematic side view. In the workpiece holder 10, a blank 11 is clamped. As shown in FIG. 2, the processing machine 1 comprises an image recording unit 12 with at least one camera 13. It may also be expedient to provide a plurality of cameras 13. The camera 13 is arranged within the housing 2 of the processing machine 1 and above the workpiece holder 10. The camera 13 comprises a camera lens 26 which is oriented in the direction toward the workpiece holder 10 for recording an image. The camera 13 comprises a longitudinal axis 19. In the preferred embodiment of the processing machine 1, the camera 13 is oriented such that the longitudinal axis 19 of the camera 13 is substantially coaxial to a longitudinal axis 25 of the workpiece holder 10. In other words, the camera 13 is arranged centered relative to the workpiece holder 10. When a blank 11 is clamped in the workpiece holder 10, the longitudinal axis 25 of the workpiece holder 10 extends through the center of the blank 11.

In an alternative embodiment of the processing machine 1, it can also be expedient to arrange the camera 13 off-center relative to the workpiece holder 10. As indicated schematically in FIG. 2, in such a case it is expedient to arrange the camera 13 in a pivoted position relative to the workpiece holder 10 in order to align the recording region of the camera 13 such that the recording region covers a blank 11 which is clamped in the workpiece holder 10. Accordingly, a complete recorded image of the blank 11 can be ensured. Due to the pivoted orientation of the camera 13 relative to the workpiece holder 10, the recorded image of the blank 11 is distorted so that the geometric conditions of the blank 11 no longer correspond to the real dimensions of the blank 11. As a compensation of the pivot angle of the camera 13, a software algorithm is employed which processes the image data and corrects the geometric conditions.

When a blank 11 is clamped in the workpiece holder 10, the processing machine 1 does not yet have sufficient information available in order to determine the absolute position of the blank 11. The blank 11 is in principle designed as a round blank. The height a of the blank 11 can vary in this context. Due to the round geometry of the blank 11, an absolute determination of the position of the blank 11 in the unprocessed state is not required. Since the blank 11 has no cutouts 21 that must be taken into consideration for processing of a workpiece 16, processing can begin at any location of the blank 11. When the blank 11 has already been processed, it comprises cutouts 21 which extend across the entire height a of the blank 11. In order to ensure that the cutting operation does not extend accidentally into the cutouts 21 of the blank 11 when manufacturing a workpiece 16 so that processing must be stopped, the absolute position of the blank 11 must be determined prior to processing.

Figure 4:
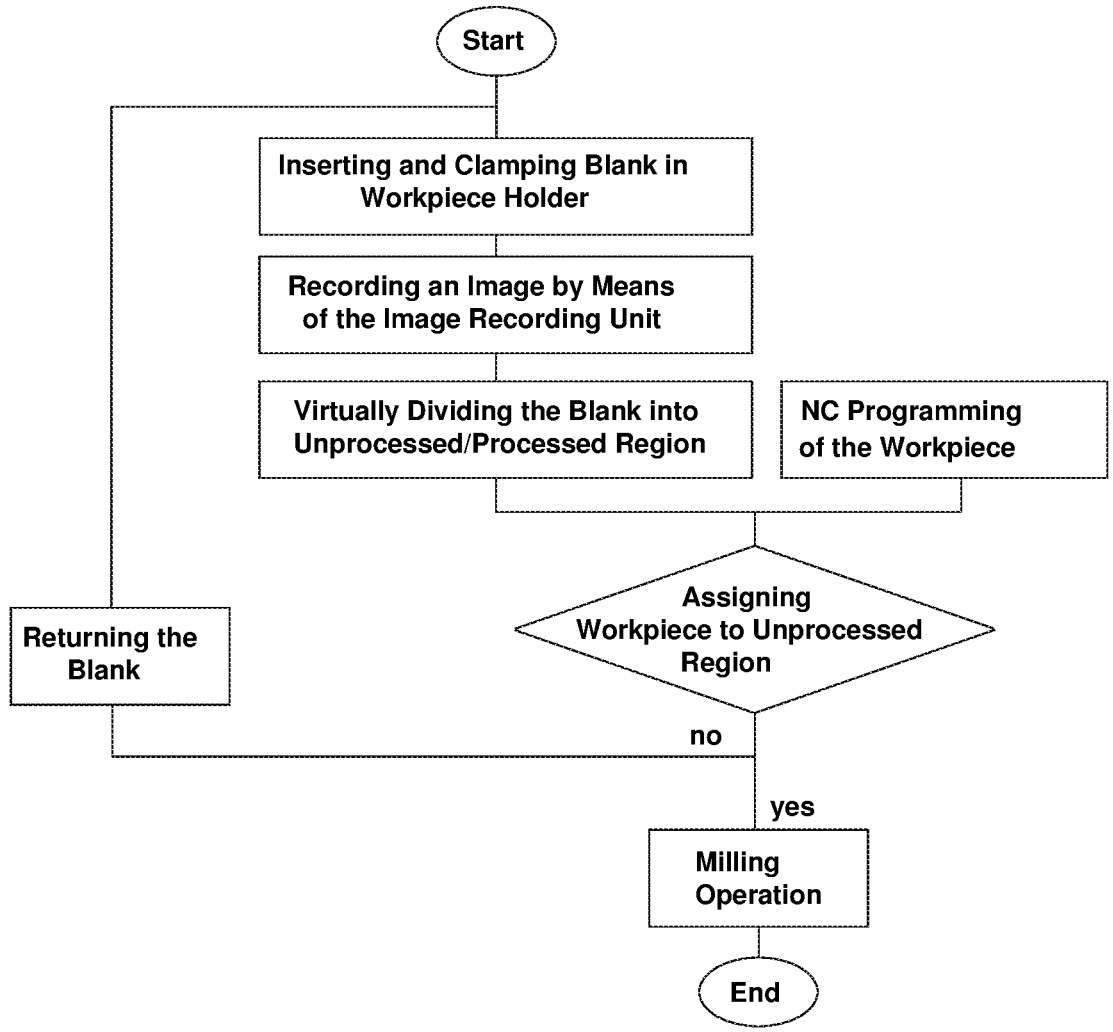
FIG. 4 is a flowchart of the method and FIG. 4a is a flowchart of a variant of the method.
Figure 4A:
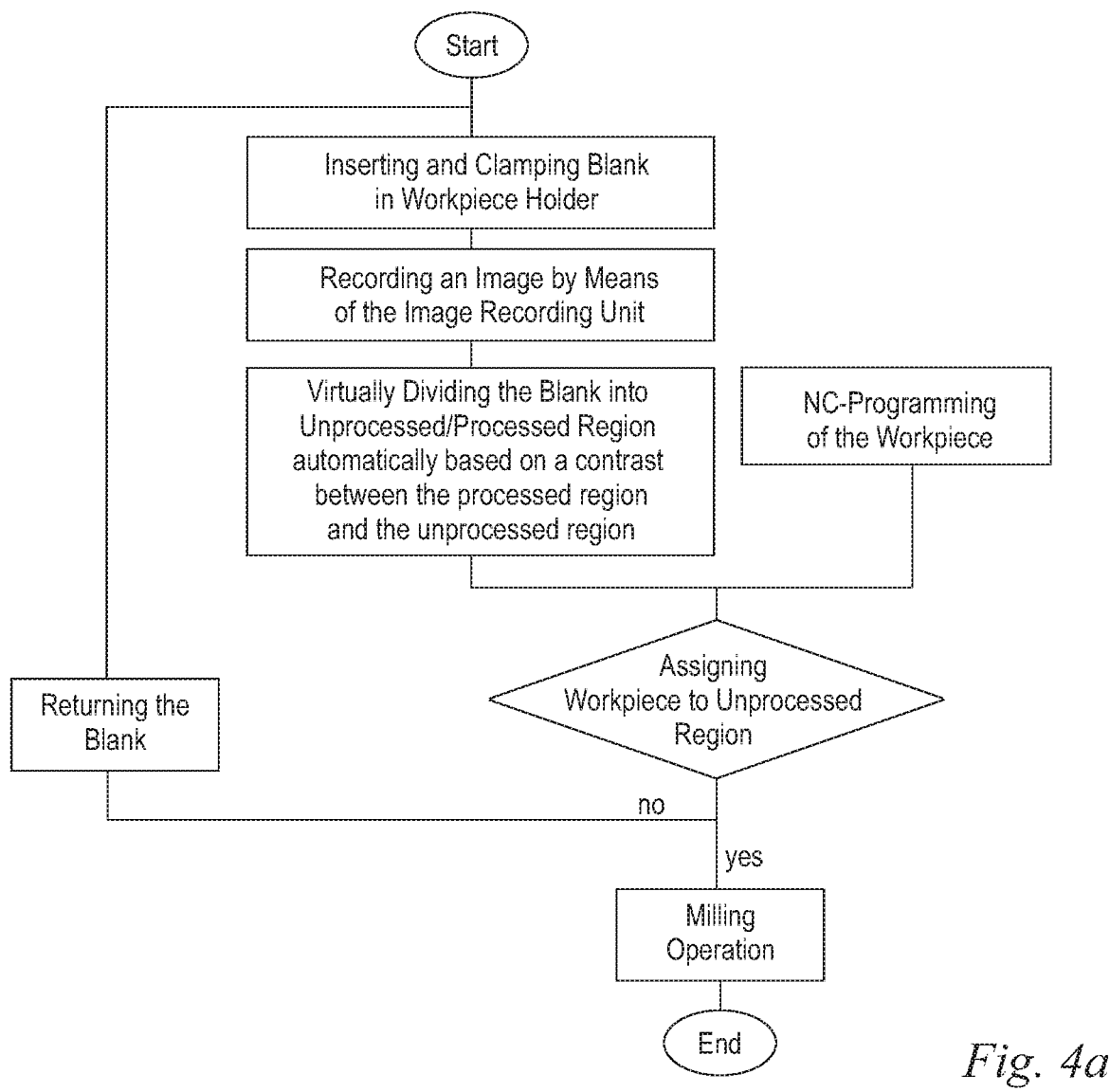

For this purpose, the blank 11 is placed into the workpiece holder 10 and clamped therein, as is illustrated in FIG. 4 in the form of a flowchart. By means of the image recording unit 12, in particular the camera 13, an image of the blank 11 is recorded. The recorded image data are conveyed to the control unit 6. By means of an image-processing software, it is detected on the basis of the image data in which region the blank processing has already been done and which region is still unprocessed. The image-processing software operates by means of a software algorithm which recognizes the different regions of the blank 11 based on contrast. In order to produce increased contrast between the different regions, in a preferred embodiment of the processing machine 1 according to FIG. 2 a light source 18 is arranged below the workpiece holder 10. When the light source 18 is activated, the blank 11 is illuminated from below. The light is blocked by the blank 11; only in the cutouts 21 the light can shine through to the camera 13 so that the contrast between the regions is increased. The blank 11 is divided by the image-processing software into an unprocessed region 15 and into a processed region 14. In the processed region 14 further processing of a workpiece 16 is not possible. In the unprocessed region 15, on the other hand, further workpieces 16 can be produced.

In the preferred embodiment of the processing machine 1, the image-processing software is coupled to the computer 24. The processed image data are conveyed to a CAM (computer-aided manufacturing) system provided on the computer 24; the CAM system serves for NC (numerical control) programming of the workpieces 16. Alternatively, the image processing software can also be integrated directly in the CAM system. On the basis of the processed image data, the CAM system recognizes in which region of the blank 11 processing of the workpiece 16 can be realized. The CAM system positions virtually the workpiece geometry to be produced in the unprocessed region 15 of the blank 11. In this context, a comparison is performed to see whether the unprocessed region 15 is sufficiently large for manufacturing the workpiece 16. When this requirement is fulfilled, the corresponding NC (numerical control) program issues and the manufacture of the workpiece 16 is started. Should the unprocessed region 15 not be sufficiently large, the process is stopped. A new blank 11 must be inserted. The process begins from the start. Preferably, the process is performed automatically.

In an alternative embodiment of the processing machine 1, the image processing software is coupled only to the control unit 6 and transmits corresponding specifications on the clamped blank 11 to the control unit 6. The CAM system issues only the NC program for manufacturing the workpiece 16 and transmits the NC program to the control unit 6. In a separate routine performed in the control unit 6, a comparison is done to see whether the unprocessed region 15 of the blank 11 is sufficiently large for manufacturing the workpiece 16.

As illustrated in FIG. 1, the preferred embodiment of the processing machine 1 comprises a workpiece changer 20 in which a plurality of blanks 11 can be stored. For processing a blank 11, the workpiece holder 10 accesses the workpiece changer 20 and picks up a blank 11. Once processing is completed, the blank 11 is returned automatically into the workpiece changer 20. When no sufficiently large unprocessed region is identified on the blank 11, the user is informed, for example, by means of a screen or monitor, not illustrated, coupled to the computer 24 or the control unit 6. Therefore, a new blank 11 must be inserted. This can be done by hand, but in the preferred embodiment the workpiece holder 10 automatically returns the blank 11 into the workpiece changer 20, puts it down therein, and picks up a new blank 11 for processing. The process then begins from the start.

In an alternative embodiment, the processing machine 1 can also be designed without workpiece changer 20 so that manual insertion or removal of the blank 11 is required.

Figure 5:
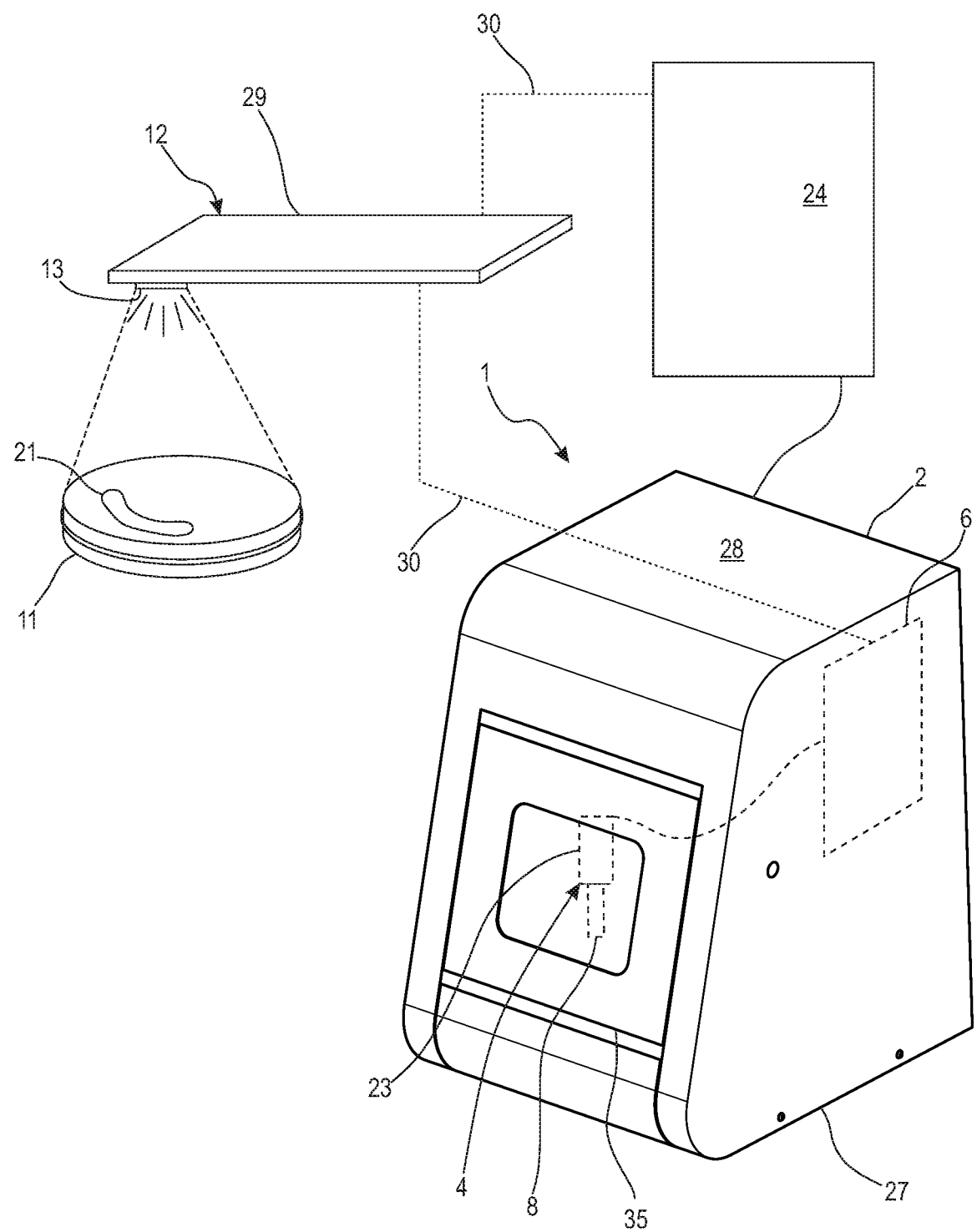
FIG. 5 is a schematic view of a dental milling machine with external image recording unit.

FIG. 5 shows a schematic illustration of a processing machine 1 and an external image recording unit 12 for an alternative embodiment of the method according to the invention. Same reference characters in FIGS. 1 and 5 refer to the same components. The processing machine 1 according to FIG. 5 differs from that of FIG. 1 in that it comprises no workpiece changer 20 and no image recording unit 12. It can be expedient to provide a workpiece changer 20 also in this embodiment of the processing machine 1 according to FIG. 5. The image recording unit 12 is embodied as an external image recording unit 12. Accordingly, the image recording unit 12 is embodied separate from the processing machine 1. The image recording unit 12 in the embodiment is configured as a portable computer 29 with a camera 13. The portable computer 29 with camera 13 can be in particular a laptop, a tablet computer, or a mobile phone. In an alternative embodiment of the image recording unit 12, it may be expedient to provide a stationary computer which is separate from the processing machine and comprises a camera 13. The camera 13 can be designed to be portable so that image recording of blanks 11 in the workpiece holder 10 can be realized also. Alternatively, the camera 13 can also be provided stationarily at the computer so that the blank 11 for recording an image must be placed below the camera 13 and subsequently inserted into the processing machine 1. It can also be expedient to provide an image recording unit 12 that is external to the processing machine and that is embodied as an optical scanner, in particular as an optical 3D scanner.

As indicated schematically in FIG. 5, the image recording unit 12 is connected by a data connection 30 to the computer 24 and/or to the control unit 6. In this way, a transmission of the recorded image data of the blank 11 can be realized from the image recording unit 12 to the computer 24 and/or to the control unit 6. The data connection 30 can be provided by a data cable. It can be expedient to provide a data connection 30 that is wireless, for example, via Bluetooth.

In an alternative embodiment of the method according to the invention, the steps according to the flowchart illustrated in FIG. 4 are performed with the difference that the image recording unit 12 is an image recording unit according to FIG. 5 which is separate from the processing machine 1.

Figure 6:
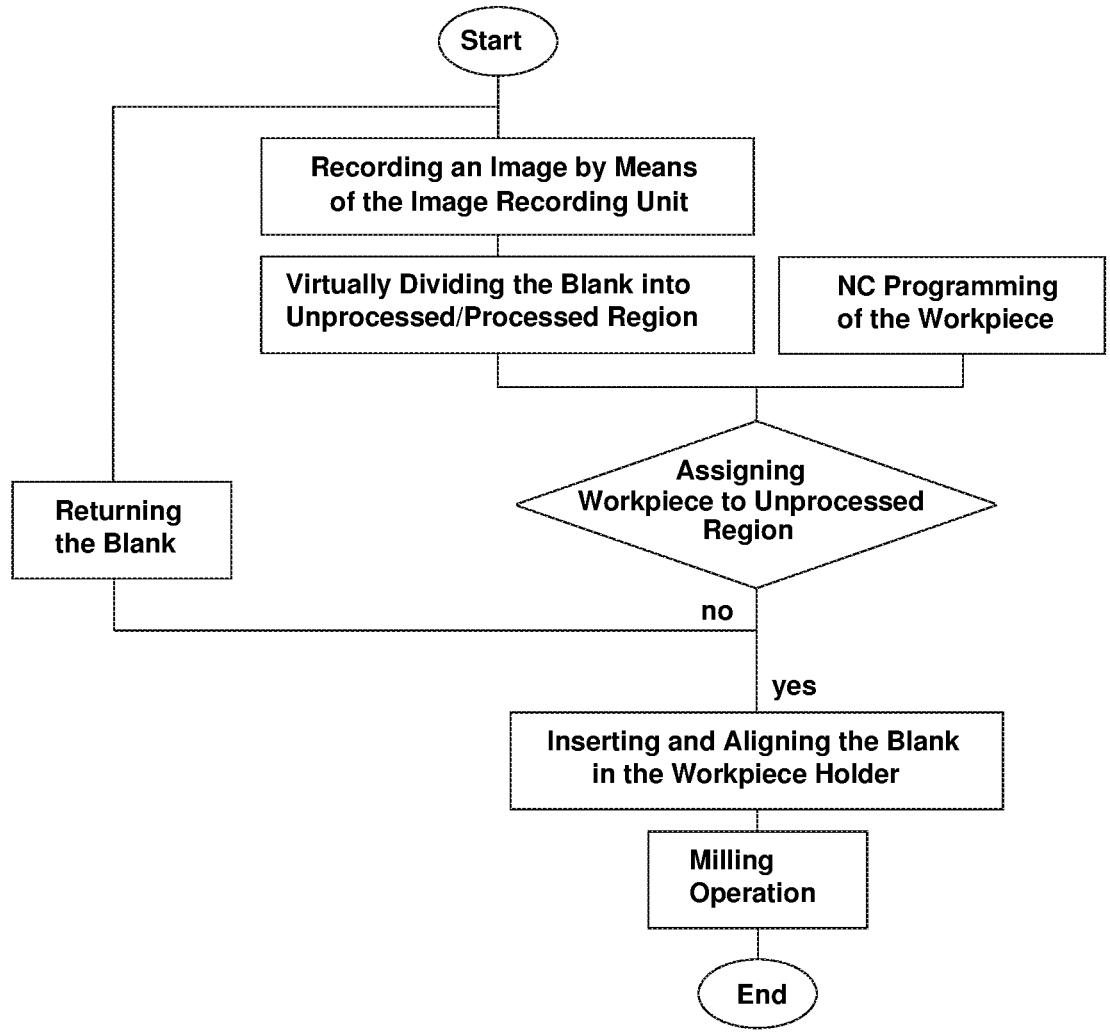
FIG. 6 is a flowchart of the method with external image recording unit.

In FIG. 6, a flowchart of a further alternative method according to the invention is illustrated. By means of the external image recording unit 12 an image is recorded of the blank 11. The image data are conveyed to the control unit 6 and/or to the computer 24. Preferably, the recorded image is transferred to the CAM system on the computer 24 which serves for NC programming of the workpieces 16. For this purpose, the image data can be either transmitted from the image recording unit 12 immediately to the computer 24 or via the control unit 6 to the computer 24. The image produced from the blank 11 is positioned congruently on top of the blank 11 generated in the CAM system. The blank 11 generated in the CAM system is arranged coaxially to the blank 11 of the image file. By means of an image-processing software algorithm which analyzes the image file, a division of the blank 11 into a processed region 14 and an unprocessed region 15 is done in the CAM system based on the image file. Subsequently, the workpiece 16 to be manufactured is assigned to the unprocessed region of the blank 11.

These steps are carried out preferably automatically by means of a corresponding software algorithm. Alternatively, the operator can position the workpiece to be manufactured by hand in the unprocessed region of the blank in the CAM system. In this way, the operator can correct the result of the software algorithm, for example. The unprocessed region can be recognized only based on the image file.

Subsequently, the blank 11 is to be placed into the processing machine 1. Alternatively, the blank 11 can also be positioned into the processing machine 1 immediately after processing of the image file. In order for the coordinate system of the blank 11, the so-called workpiece coordinate system, to match the coordinate system of the processing machine 1, the blank 11 is to be aligned by means of a marking relative to the workpiece holder 10. As a marking, for example, notches, steps or color markings can be provided on the blank 11. Preferably, the workpiece holder 10 has also corresponding markings. In this way, the blank 11 can be aligned by its marking relative to the marking of the workpiece holder 10. When the blank 11 is positioned in the workpiece holder 10, the milling operation is carried out in the unprocessed region 15 of the blank 11.

In an alternative embodiment of the image recording unit 12, additional information can be stored in the image recording unit 12 by the user. For example, the blank type, in particular the dimensions of the blank as well as the corresponding material of the blank, can be provided. This information is transmitted together with the recorded image file to the computer 24. Subsequently, in the CAM system, on the basis of the provided additional information, a blank is automatically generated and the image file is applied to the blank. Subsequently, the assignment in regard to the unprocessed region 15 and the processed region 14 is done, and positioning of the workpiece 16 to be manufactured in the unprocessed region 15 is performed. The further processing steps are carried out as discussed above.

The specification incorporates by reference the entire disclosure of German priority document 10 2019 005 849.6 having a filing date of Aug. 20, 2019.

While specific embodiments of the invention have been shown and described in detail to illustrate the inventive principles, it will be understood that the invention may be embodied otherwise without departing from such principles.

What is claimed is:

1. A method for automated positioning of a blank in a processing machine, wherein the processing machine comprises: a housing and a spindle unit with an electric motor; a control unit configured to control and to electrically supply the processing machine; a computer configured to produce processing programs for manufacturing workpieces; a workpiece holder; and an image recording unit configured to optically record image data of the blank received in the workpiece holder; the method comprising:

fixing the blank in the workpiece holder;
the image recording unit producing an image of the blank;
performing a division of the blank into an already processed region and into an unprocessed region based on image data of the image of the blank;
assigning a workpiece geometry to be produced to the unprocessed region of the blank; and
performing a milling operation on the unprocessed region of the blank.

2. The method according to claim 1, further comprising arranging the image recording unit in the housing of the processing machine.

3. The method according to claim 1, further comprising providing the image recording unit with at least one camera.

4. The method according to claim 3, further comprising arranging the at least one camera above the workpiece holder.

5. The method according to claim 3, wherein the at least one camera has a longitudinal axis, the method further comprising orienting the at least one camera such that the longitudinal axis of the at least one camera is aligned coaxially to the workpiece holder.

6. The method according to claim 1, wherein performing the division between the processed region and the unprocessed region involves automatically performing the division based on a contrast between the processed region and the unprocessed region.

7. The method according to claim 6, further comprising arranging a light source below the workpiece holder, which light source is for increasing the contrast between the processed region and the unprocessed region.

8. The method according to claim 1, wherein the step of assigning the workpiece geometry to be produced to the unprocessed region of the blank is carried out automatically by the control unit.

9. The method according to claim 1, wherein the step of assigning the workpiece geometry to be produced to the unprocessed region of the blank is carried out automatically by the computer via a CAM (computer-aided manufacturing) system.

10. The method according to claim 1, wherein the processing machine comprises a workpiece changer, the method further comprising the step of storing a plurality of blanks in the workpiece changer.

11. The method according to claim 10, further comprising, when assigning the workpiece geometry to the unprocessed region fails, accessing another blank of the plurality of blanks stored in the workpiece changer.

12. The method according to claim 1, wherein the processing machine is a dental milling machine.

* * * * *